United States Patent Office

3,553,286
Patented Jan. 5, 1971

3,553,286
POLYAMIDES AND SULFONIC ACID GROUP
CONTAINING VINYL POLYMERS
Hiroshi Murata, Kozo Katuda, and Tetsunosuke Kunitomo, Ohtsu-shi, Shosaku Sasaki, Shiga-ken, and Minoru Nishio, Ohtsu-shi, Japan, assignors to Toyo Rayon Kabushiki Kaisha, Tokyo, Japan, a corporation of Japan
No Drawing. Filed July 31, 1967, Ser. No. 657,021
Claims priority, application Japan, Aug. 5, 1966,
41/51,037; Jan. 7, 1967, 42/1,230
Int. Cl. C08g 41/04
U.S. Cl. 260—857     1 Claim

ABSTRACT OF THE DISCLOSURE

Polyamide compositions having durable antistatic effect, hygroscopicity, soil resistance and dyeability are obtained by adding a substantially linear and water- or alcohol-soluble vinyl polymer having 0.2 to 2.0 sulphonic acid groups per repeating unit, 10 to 95% of the said sulphonic acid groups being present in the form of a salt of lithium, potassium, sodium or calcium and 5 to 90% of the said sulphonic acid groups being present in the form of an ammonium salt or organic amine salt.

---

Polyamide has excellent mechanical and chemical properties, and finds wide applications as synthetic fibers and plastics. It, however, suffers from some defects. For instance, the staples, yarns, knitted and woven fabrics from polyamide have a tendency to electrostatic charge by friction, and this tendency gives rise to many troubles in actual use besides the production and processing steps. In wearing a garment made from polyamide, the static charge phenomenon not only gives the wearer an uncomfortable feeling but also gives the garment a dirty appearance because of collection of dust. Similar troubles occur in the use of plastic materials made from polyamide. Furthermore, polyamide has a defect of low hygroscopicity and tendency of yellowing.

With a view to removing some of these defects, an attempt to apply a sodium salt of a sulphonated vinyl polymer to a polyamide textile material has previously been proposed. The effect by this treatment, however, is only temporary, and is not prolonged.

It has been found that a polyamide composition without the deterioration of inherent excellent mechanical properties and having a prolonged antistatic effect, hygroscopicity, soil resistance and dyeability is obtained by adding a substantially linear and water- or alcohol-soluble vinyl polymer having 0.2 to 2.0 sulphonic acid groups per repeating unit, 10 to 95% of the said sulphonic acid groups being present in the form of a salt of a metal selected from the group consisting of lithium, potassium, sodium and calcium and 5 to 90% of the said sulphonic acid groups being present in the form of an ammonium salt or organic amine salt.

A preferable sulphonic acid-containing vinyl polymer usable in this invention is obtained by sulphonating a vinyl polymer in which at least 80 mole percent of the repeating unit is

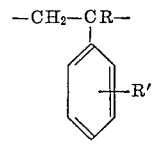

(I)

wherein R and R′ represent a hydrogen atom or a lower alkyl such as methyl, with a sulphonating agent such as concentrated sulphuric acid, fuming sulphuric acid, chlorosulphonic acid, anhydrous sulphuric acid, and a complex salt of anhydrous sulphuric acid with dioxane, and then neutralising it. The polymer before neutralisation may have a molecular weight of 1,000 to 300,000. As the vinyl polymer, especially preferable are polymers and copolymers of an aromatic vinyl compound such as styrene, vinyl toluene and α-methylstyrene etc. As the copolymer component, there are unsaturated mono- or dicarboxylic acids such as maleic anhydride; aliphatic olefines and diolefines itaconic acid, their alkali metal salts, their alkaline earth metal salts, and their esters; unsaturated acid anhydrides such as maleic anhydride; aliphatic olefines and diolefines such as isobutylene and butadiene; unsaturated nitriles such as acrylonitrile; and unsatrated acid amides such as acrylic amide beside the above-mentioned aromatic vinyl compounds.

Another method of producing the sulphonic acid group-containing vinyl polymer usable in this invention comprises polymerising a vinyl monomer already containing a sulphonic acid group or its salt (for instance, salt of alkali metal, alkaline earth metal, ammonia or amine) alone or with a suitable comonomer. Examples of the sulphonic acid group-containing vinyl monomer are styrene sulphonic acid, allylsulphonic acid, vinyltoluenesulphonic acid, vinylsulphonic acid, methallylsulphonic acid, and their salts.

The sulphonic acid group-containing vinyl polymer used in this invention contains 0.2 to 2.0 sulphonic acid groups per repeating unit, and it is necessary that 10 to 95% of the said sulphonic acid groups is present in the form of a salt of a metal selected from lithium, potassium, sodium and calcium, and 5 to 90% of the said sulphonic acid groups are present in the form of an ammonium salt or an organic amine salt. When the content of the said sulphonic acid groups is lower than the said lower limit, the advantages of this invention will not be completely attained. A vinyl polymer having the sulphonic acid group content higher than the said upper limit is often insoluble and infusible, and is difficult to disperse uniformly in polyamide.

A sulphonic acid group-containing vinyl polymer in which the whole of the sulphonic acid group is present in the form of a salt of an alkali metal (Li, Na or K) or calcium salt has bad compatibility with polyamide. A composition consisting of such polymer and polyamide is prone to undergo separation between components. In addition, the treatment of such composition with hot water easily leads to the extraction of the vinyl polymer. With such a vinyl polymer, therefore, it is impossible to impart polyamide a prolonged antistatic effect and capability of preventing soiling.

On the other hand, a sulphonic acid group-containing vinyl polymer in which all of the sulphonic acid groups are present in the form of a salt of ammonium or organic amine has a good compatibility with polyamide. If a polyamide-forming precursor, for instance, ε-caprolactam or nylon salt, is subjected to polymerisation conditions in the presence of such a vinyl polymer, it is difficult to obtain polyamide of a polymerisation degree high to a necessary extent.

It is very surprising and unexpected that the above-defined sulphonic acid group-containing vinyl polymer in which 10 to 95% (preferably, 50 to 90%) of the sulphonic acid group is present in the form of a salt of lithium, potassium, sodium or calcium, and 5 to 90% (preferably 10 to 50%) of the sulphonic acid group is present in the form of a salt of ammonia or organic amine does not obstruct the polymerisation of the polyamide precursor to polyamide and rather promotes the polymerisation of lactams to polyamide, and that the obtained polyamide composition has a prolonged antistatic effect and ability to prevent soiling.

It is not preferable that the neutralised sulphonic acid group-containing vinyl polymer to be added to polyamide or its precursor according to this invention contains a great quantity of a free sulphonic acid group. But a small amount of sulphonic acid group in the neutralised vinyl polymer, for instance, about less than 10%, may be present in the free acid form. A vinyl polymer containing a large amount of the sulphonic acid group present in the form of a salt of other metal such as Ba has a poor compatibility with polyamide, but a very minor proportion of a sulphonic acid group in the vinyl polymer (for instance, not larger than 5%) may be in the form of other metal salt.

The ammonium salt and amine salt of sulphonic acid can be expressed by the formula $-SO_3NR_1R_2R_3R_4$ (wherein $R_1$, $R_2$, $R_3$ and $R_4$ are the same or different, and each represent a hydrogen atom, an alkyl group, alkylaryl group, aryl group or aralkyl group which group may have an amino, carboxy, sulphonic acid, carbonyl or hydroxy substituent; and each two of them together may form a 5-membered or 6-membered heterocyclic ring with the quaternary nitrogen atom). The organic amine usable for the formation of amine salt includes amino acid such as ε-aminocaproic acid in addition to aliphatic or aromatic monoamines such as ethylamine, aniline, and aliphatic or aromatic diamines such as hexamethylene diamine, and xylylene diamine.

The amount of the neutralised sulphonic acid group-containing vinyl polymer to be used depends on the type of polymers, the content of the sulphonic acid group, the degree of neutralisation and the proportion of the metal salt and amine salt (or ammonium salt), but may usually be in the range of about 0.1 to 10% by weight based on the polyamide or its precursor. The use of the vinyl polymer in the amount less than the lower limit mentioned above sometimes does not lead to the achievement of the objects of this invention, and on the other hand, the use of it in the amount in excess of the upper limit often deteriorates the inherent excellent properties of polyamide.

It is preferable that the neutralised sulphonated polymer is added to polyamide before polyamerisation, but the time of addition may be during or after the polymerisation. The polymer may be added in the powdery form or in the form of a solution in water or alcohol, but it is preferable to add it in the form of solution. The neutralised sulphonated polymer can be a catalyst when polyamide is made by polymerising lactams, it is possible to polyamerise a lactam to which a salt of a sulphonated polymer has been added, in almost anhydrous condition. It is generally preferable, however, to initiate the polymerisation after the sulphonated polymer is added to an aqueous solution of a monomer (lactam, ω-amino acid or salt of dibasic acid and diamine) and dissolved uniformly.

Other highly polymeric material may be blended with polyamide produced by adding a salt of a sulphonated polymer. Accordingly, it is possible to prepare polyamide containing a great quantity of a sulphonated material beforehand, and blend with it an ordinary polyamide not containing a salt of the sulphonated polymer.

The neutralised and sulphonated vinyl polymer used in this invention is soluble in water or alcohol at the stage where it is added to polyamide or its precursor, but is hardly extracted with hot water from a final shaped article such as fibers, filaments, yarns, fabrics or films obtained from the composition of this invention. Although there has yet been no confirmation, we presume that it is because the vinyl polymer is converted into an insoluble matter by itself or by chemical reaction with the polyamide or its precursor owing to heat at the stage of the polymerisation and/or melt-shaping.

As a matter of fact, a minor amount of an ordinary delusterant, stabiliser, antistatic agent, dyestuff or pigment may be added to the composition of this invention.

Particularly, the addition of polyalkylene ether such as polyethylene glycol, polypropylene glycol and polybutylene gycol not only facilitates the effect of static prevention, resistance to soiling, and dyeability but also gives rise to the decrease in the yarn breakage and occurrence of fuzz in the obtained fibers and also to the improvement of tenacity of the fibers. This polyalkylene ether is more effective as its molecular weight gets larger, and particularly preferably polyalkylene ether is one having an average molecular weight of above 1,000,000. The preferable amount of polyalkylene ether to be added is 0.5 to 7% by weight based on the polyamide, as an excessive amount causes undesirable phenomena such as the decrease in tenacity and increase of yarn breakage.

The composition of this invention is shaped by the procedure ordinarily employed in shaping polyamide, and is made into fibers, films, and other shaped articles.

The polyamide referred to in the specification and claims of this application includes an ordinary fiber-forming polyamide synthesised from lactams such as ε-caprolactam and ω-laurin lactam; ε-amino acids such as ε-aminocaproic acid and 11-aminoundecanic acid; and a combintion of an aliphatic or aromatic diamine such as hexamethylene diamine, nonamethylene diamine and m-xylene diamine with an aliphatic or aromatic dicarboxylic acid such as adipic, sebacic acid and terephthalic acid.

This invention will now be described with reference to the following examples to which the invention is in no way limited.

EXAMPLE 1

Polystyrene (Styron 666, product of Asashi Dow) having an average molecular weight of about 130,000 was sulphonated with a complex salt of anhydrous sulphuric acid with dioxane, and sulphonated polystyrene having a degree of sulphonation of 84.2% was obtained. (In this specification, the degree of sulphonation of sulphonated polystyrene containing one sulphonic acid group per styrene unit is defined as 100%.) The sulphonated polystyrene in the state of aqueous solution was neutralised with sodium hydroxide and ammonium, and a neutralised polymer having an $SO_3Na/SO_3NH_4$ ratio of 75/25 was obtained. The neutralised polymer in 10% aqueous solution was added to ε-caprolactam in an amount calculated as solid content of 7.5% based on the weight of the ε-caprolactam. The mixture was subjected to polymerisation for 19 hours at 260° C., and melt-spun at 265° C. The extruded filaments were drawn to 3 times the original length by using a hot plate. The antistatic property of the obtained drawn filaments was compared with that of the control nylon 6 filaments (with no additive), and the results are shown in Table I.

TABLE I.—COMPARISON OF ANTISTATIC PROPERTY

| Sample | 40% RH (25° C.) | | 65% RH (20° C.) | | Ash test | |
|---|---|---|---|---|---|---|
| | Frictional voltage (v.) | Half value period (sec.) | Frictional voltage (v.) | Half value period (sec.) | 3 cm. | 7 cm. |
| Nylon 6 with the additive | +350 | 0.5 | +5 to +10 | 0 | — | — |
| Nylon 6 without additive | +3,600 | >120 | +2,000 to +2,500 | 15 | + | + |

NOTE:
1. Sample: The sample was extracted with hot water at 95° C. for 5 hours, dried, and conditioned for 24 hours under the measuring conditions before measuring.
2. Frictional voltage: The sample was rubbed for 30 seconds by means of a wooden rotary drum, and the measurement was conducted by Rion electrostatic fieldmeter.
3. Half value period: The time required for the frictional voltage generated by a 30 second friction to decrease to half its value.
4. Ash test: A test sample is rubbed by a polyester taffeta at 21° C. and at a RH of 48%. When it catches tobacco ash at a height of 3 cm. and 7 cm., the result is indicated by the plus mark, and when it does not, the minus mark is used to show the result.

When an undershirt made of nylon 6 yarns to which sodium-ammonium salt of sulphonated polystyrene had been added was subjected to wearing test, there was not observed a static charge phenomenon such as the sound of discharge at the time of undressing and the clinging of the shirt to the human body at the time of dressing. This effect did not decrease even by 20 times of washing.

EXAMPLE 2

In accordance with Example 1, polystyrene sulphonic acid was produced. It was neutralised with caustic soda and ammonia so that —$SO_3Na$/—$SO_3NH_4$ may be 80/20 and 77/23, and polystyrenesulphonic acid salt was prepared.

By the use of this salt and polyethylene oxides having an average molecular weight of 500,000 and 1,000,000 respectively based on ε-caprolactam, the ε-caprolactam was polymerised, spun and drawn (to about 3.5 times) to get filaments. The properties of the filaments are shown in Table II.

TABLE II

| | Sulphonated polystyrene | | Polyethylene oxide | | Percentage of yarn breakage | Percentage of fuzz occurence | Antistatic property (40% RH, 25° C.) | |
|---|---|---|---|---|---|---|---|---|
| | —$SO_3Na$/ —$SO_3NH_4$ | Amount (percent) | Average molecular weight | Amount (percent) | | | Frictional voltage (v.) | Half value period (sec.) |
| Sample: | | | | | | | | |
| 1 | 77/22 | 3 | | | 0 | 6.3 | 12 | 2,000 | 30 |
| 2 | 80/20 | 5 | | | 0 | 12.5 | 25 | 900 | 0.5 |
| 3 | 80/20 | 4 | 500,000 | 3 | 3.5 | 4 | 340 | 0.5 |
| 4 | 77/23 | 5 | 500,000 | 3 | 5.0 | 6 | 300 | 0.5 |
| 5 | 77/23 | 5 | 1,000,000 | 5 | 6.2 | 7 | 120 | <0.5 |

NOTE:
1. Percentage of yarn breakage: A ratio of the number of bobbins where the yarn breakage occured to that of the total bobbins when about 900 g. of drawn and twisted yarns were wound up on a plurality of bobbins.
2. Percentage of fuzz occurence: The number of fuzzes per 3,000,000 meters as examined by means of Lindly's Fuzz-Inspector.

EXAMPLE 3

Commercially available polystyrene (Styron 666) was sulphonated with concentrated sulphuric acid with the use of silver sulphate as a catalyst, and sulphonated polystyrene having a degree of sulphonation of 82.2% was obtained.

The polymerisation of nylon 6 was carried out accordingly to the procedure of Example 1 except that the neutralised polymer shown in Table II and obtained from the above-mentioned sulphonated polystyrene was used in the amount indicated in Table III. The results are shown in Table III.

TABLE III

| | Sulphonated polystyrene | | Separation between components in a polymerisation step | $\eta_r$ of polyamide | Antistatic property (40% RH, 25° C.) | |
|---|---|---|---|---|---|---|
| | Neutralisation ratio (Na/NH$_4$) | Amount of addition percent based on pure lactam | | | Frictional voltage (v.) | Half value period (sec.) |
| Sample: | | | | | | |
| 1 (Control) | 100/0 | 5 | Observed | 2.41 | | |
| 2 | 70/30 | 5 | Not observed | 1.93 | +1,500 | 5 |

NOTE: $\eta_r$ is a relative viscosity measured at 25° C. in a 98% sulphuric acid.

A salt manufactured from the said sulphonated polystyrene in which Na/Ba/NH$_4$ is 80/10/10 was added to ε-caprolactam in an amount of 5% by weight. When the mixture was subjected to the similar polymerisation conditions, the separation between components occurred during the polymerisation step. Namely, the added salt was precipitated and separated from the polymerisation reaction system.

EXAMPLE 4

A sulphonated polystyrene (having a degree of sulphonation of 85%) obtained by sulphonating polystyrene having an average molecular weight of about 20,000 was neutralised with sodium hydroxide and ammonium so that —$SO_3Na$/—$SO_3NH_4$ may be 70/30, and a salt of sulphonated polystyrene was obtained. This salt was added to ε-caprolactam in an amount of 7% by weight, and the mixture was subjected to polymerisation conditions to make polyamide. Furthermore, an ordinary polyamide (nylon 6) was blended with this polyamide so that the content of the salt of sulphonated polystyrene might be 2% by weight.

Drawn yarns produced from the polyamide, even after having been extracted for 5 hours with hot water, were dyed very bright by such basic dyes as Sevron Yellow L, Crystal Violet, and Astrazon Blue FGL. The fastness was good especially with respect to Sevron Yellow L. In the meantime, when an acid dye such as Solway Blue BN is used to dye such drawn yarns, the amount of dye-absorption slightly decreased at a pH of more than 5.

EXAMPLE 5

Nylon 6 yarns were produced in the same manner as in Example 1 except the use of the salt of sulphonated polystyrene indicated in the table. The antistatic properties of the obtained yarns are shown in Table IV.

TABLE IV

| Sample | Sulphonated polystyrene | | | | Antistatic property (40% RH, 25° C.) | |
|---|---|---|---|---|---|---|
| | Molecular weight of polystyrene | Neutralisation ratio | Amount (percent based on pure lactam) | Degree of sulphonation (percent) | Frictional voltage (v.) | Half value period (sec.) |
| 1 | 20,000 | K/NH$_2$=20/80 | 5 | 52.8 | +1,800 | 9 |
| 2 | 2,000 | Na/NH$_4$=80/20 | 7.5 | 75.4 | +1,300 | 3 |

EXAMPLE 6

Five percent by weight of the sulphonated polystyrene prepared in Example 1 was added to nylon 66 salt prepared from hexamethylene diamine and adipic acid, and the mixture was polymerised under pressure. From the obtained polyamide, nylon 66 yarns were produced by spinning at 290° C. and drawing to 3.5 times. The antistatic properties of the obtained nylon 66 yarns are shown in Table V in comparison with those of control nylon 66 yarns.

TABLE V

| Sample | 4% RH, 25° C. | | Ash test (48% RH, 21° C.) 3 cm. |
|---|---|---|---|
| | Frictional voltage (v.) | Half value period (sec.) | |
| Modified nylon 66 | +800 | 1 | − |
| Nylon 66 | +4,000 | >120 | + |

EXAMPLE 7

Styrene and methyl methacrylate were copolymerised in benzene (80 mole percent of styrene and 20 mole percent of methyl methacrylate) to get a copolymer having a viscosity in 10% toluene solution of 16.5 centipoise. The obtained copolymer was sulphonated with a complex salt of anhydrous sulphuric acid and dioxane to give a water-soluble sulphonated copolymer having a degree of sulphonation of 72%. This sulphonated copolymer was completely neutralised with caustic soda and ammonium to prepare a salt having an —SO$_3$Na/—SO$_3$NH$_4$ ratio of 50/50. This salt was added to ε-caprolactam in an amount of 5% by weight to produce polyamide. The yarns obtained from this polyamide showed (−) by the ash test (3 cm.) mentioned in Example 1.

EXAMPLE 8

Methyl methacrylate was copolymerised with sodium methallyl sulphonate in dimethyl sulphoxide (70 mole percent of methyl methacrylate and 30 mole percent of sodium methallyl sulphonate), and the copolymer was purified by re-precipitation. This copolymer was dissolved into water to effect ionic exchange to sulphonate it. The sulphonated copolymer was completely neutralised with ammonia and caustic soda to prepare a salt having an —SO$_3$Na/—SO$_3$NH$_4$ of 50/50. The salt was added to ε-caprolactam in an amount of 5% by weight, and the mixture was polymerised to make a homogeneous polyamide. The yarns obtained from this polyamide showed a minus sign (−) by the ash test described in Example 1.

EXAMPLE 9

Sulphonated polystyrene synthesised from polystyrene having an average molecular weight of about 20,000 was neutralised so that SO$_3$Na/SO$_3$NH$_4$ might be 70/30. This neutralised polystyrene was added to ε-caprolactam. The obtained polyamide had a capability of preventing soiling shown in Table VI and hygroscopicity shown in Table VII.

TABLE VI

| Sample | Dry soiling | | Wet soiling | |
|---|---|---|---|---|
| | Degree of soiling (percent) | Efficiency of detergency (percent) | Degree of soiling (percent) | Efficiency of detergency (percent) |
| Modified nylon 6 | 61.9 | 100.0 | 63.8 | 98.7 |
| Nylon 6 | 65.4 | 99.5 | 67.2 | 97.0 |

Note.—Degree of soiling and efficiency of detergency were computed in accordance with the following equations:

$$\text{Degree of soiling} = \frac{R_o - R_s}{R_o} \times 100$$

$$\text{Efficiency of detergency} = \frac{R_w - R_s}{R_o - R_s} \times 100$$

wherein
R$_o$: percentage of reflectance of an original fabric.
R$_s$: percentage of reflectance of a soiled fabric.
R$_w$: percentage of reflectance of a washed fabric.

With the use of Photoelectric photometer SPR–2 Type (product of Hitachi Seisakusho), the reflectance of a magnesium oxide plate had been defined as 100 as a standard value, and the reflectance of each of the above-mentioned fabrics had been measured.

TABLE VII

| Sample | Hygroscopicity (percent)* | |
|---|---|---|
| | 65% RH | 100% RH |
| Modified nylon 6 | 5.11 | 9.79 |
| Nylon 6 | 4.39 | 8.14 |

*This represents an increase in weight from the completely dried weight. The moisture conditioning was done for 48 hours.

EXAMPLE 10

In the same manner as in Example 3, polystyrenesulphonic acid having a degree of sulphonation of 85% was prepared, and neutralised with Ca(OH)$_2$. An aqueous solution of the obtained calcium polystyrene sulphonate was contacted with a cationic exchange resin thereby to convert part of the calcium salt into a free sulphonic acid. It was neutralised with ammonia to get polystyrene sulphonic acid salt having an —SO$_3$Ca$_{1/2}$/—SO$_3$NH$_4$ of 45/55. This salt was added to ε-caprolactam in the same manner as in Example 1, and the yarns were prepared likewise. The obtained yarns were subjected to the same ash test as in Example 1, and showned (—) at a height of 3 cm.

EXAMPLE 11

An aqueous solution of polystyrene sulphonic acid manufactured in accordance with Example 3 was neutralised with NaOH and aniline so that 70% of the sulphonic acid group might be Na salt and 30% of the sulphonic acid group might be aniline salt, and polystyrenesulphonic acid salt. This salt was added to ε-caprolactam in an amount of 3% by weight, and a homogeneous polymer was prepared from the resulting mixture. The drawn yarns obtained from this polymer, even after having been extracted with hot water for 5 hours, were dyed very bright by means of such a cationic dyestuff as Sevron Yellow L and Crystal Violet.

EXAMPLE 12

An aqueous solution of polystyrenesulphonic acid prepared according to Example 1 was neutralised with a NaOH and ε-aminocaproic acid, and polystyrenesulphonic acid salt having an —$SO_3Na$/—$SO_3H_3N(CH_2)_5COOH$ ratio of 70/30 was obtained. This salt was added to ε-caprolactam in an amount of 6%, and polymerised. The obtained polymer was spun and drawn. When the obtained yarns were subjected to the same ash test as in Example 1, they showed (—) at a height of 3 cm.

We claim:
1. A process for the manufacture of a polyamide composition, which comprises mixing a fiber-forming polyamide and 0.1 to 10 percent by weight, based on the said polyamide, of a water- or alcohol-soluble substantially linear vinyl polymer containing 0.2 to 2.0 sulphonic acid groups per repeating unit of the said vinyl polymer, 10 to 95 percent of the said sulphonic acid groups being present in the form of sulphonic acid salt of a metal selected from lithium, potassium, sodium, and calcium, and 5 to 90 percent of the said sulphonic acid groups being present in the form of ammonium salt or organic amine salt uniformly with a polyamide-forming precursor in an amount of 0.1 to 10 percent by weight based on the said precursor, and subjecting the resulting mixture to polymerisation conditions.

References Cited
UNITED STATES PATENTS 2,676,896  4/1954  Cohen _____ 260—857
3,213,053  10/1965  Kendrick _____ 260—29.6

PAUL LIEBERMAN, Primary Examiner

U.S. Cl. X.R.

260—78, 79.3, 79.5, 79.7